_United States Patent_ [19]

Shaw et al.

[11] Patent Number: 4,554,510

[45] Date of Patent: Nov. 19, 1985

[54] SWITCHING FIBER OPTIC AMPLIFIER

[75] Inventors: Herbert J. Shaw, Stanford; Michel J. F. Digonnet, Palo Alto, both of Calif.

[73] Assignee: The Board of Trustees of Leland Stanford Junior University, Stanford, Calif.

[21] Appl. No.: 531,231

[22] Filed: Sep. 12, 1983

[51] Int. Cl.⁴ .................. H01S 3/094; H03F 3/68
[52] U.S. Cl. ............................. 330/4.3; 330/4; 330/84; 330/85; 330/122; 372/6; 372/71
[58] Field of Search .................. 330/4.3, 4, 84, 5, 122, 330/147.8; 372/6, 71; 455/607; 350/96.15; 332/7.51

[56] References Cited

U.S. PATENT DOCUMENTS

| | | | |
|---|---|---|---|
| 3,230,474 | 1/1966 | Keck et al. | 331/94.5 |
| 3,456,211 | 7/1969 | Koester | 372/6 |
| 3,731,225 | 5/1973 | Wild et al. | 350/96 B |
| 3,753,145 | 8/1973 | Chesler | 330/4.3 |
| 3,902,130 | 8/1975 | Pike | 330/43 |
| 3,914,709 | 10/1975 | Pike et al. | 331/94.5 |
| 3,957,341 | 5/1976 | Taylor | 350/96 C |
| 3,975,692 | 8/1976 | Mego, Jr. et al. | 331/94.5 |
| 4,136,929 | 1/1979 | Suzaki | 350/96.15 |
| 4,243,297 | 1/1981 | Elion | 350/96.15 |
| 4,258,336 | 3/1981 | Fletcher et al. | 356/350 |
| 4,300,811 | 11/1981 | Ettenberg et al. | 350/1.1 |
| 4,301,543 | 11/1981 | Palmer | 350/96.15 |
| 4,307,933 | 12/1981 | Palmer et al. | 350/96.16 |
| 4,315,666 | 2/1982 | Hicks, Jr. | 350/96.15 |
| 4,335,933 | 6/1982 | Palmer | 350/96.19 |
| 4,342,499 | 8/1982 | Hicks, Jr. | 350/96.15 |
| 4,343,532 | 8/1982 | Palmer | 350/96.19 |
| 4,362,359 | 12/1982 | Dammann | 350/96.19 |
| 4,383,318 | 5/1983 | Barry et al. | 350/96.24 |

FOREIGN PATENT DOCUMENTS

| | | |
|---|---|---|
| 038023 | 10/1981 | European Pat. Off. . |
| 1439469 | 11/1968 | Fed. Rep. of Germany . |
| 53-91752 | 11/1978 | Japan . |
| 55-76308 | 6/1980 | Japan . |
| 57-85004 | 5/1982 | Japan ............... 350/96.13 |
| 1094639 | 12/1967 | United Kingdom . |

OTHER PUBLICATIONS

C. A. Burrus and J. Stone; _Single-Crystal Fiber Optical Devices: A ND:YAG Fiber Laser_, Applied Physics Letters, vol. 26, No. 6, 3-15-75, pp. 318-320.
Bergh et al., Electronic Letters, vol. 16, No. 7, Mar. 27, 1980, "Single Mode Fiber Optic Directional Coupler", pp. 260-261.

List continued on next page.

_Primary Examiner_—S. C. Buczinski
_Assistant Examiner_—Burton J. Carniol
_Attorney, Agent, or Firm_—Knobbe, Martens, Olson & Bear

[57] ABSTRACT

A fiber optic amplifier utilizes a crystal fiber of laser material to bidirectionally amplify light signals. This amplifier permits the application of both pumping illumination and the signal to be amplified to the end of the crystal fiber to avoid the disadvantages inherent in side pumping this fiber. End pumping is accomplished by taking advantage of the slow spontaneous fluorescence of the laser crystal to sequentially apply the pumping illumination and then the signal to be amplified to the crystal. This sequential application of signals is made possible through the use of a switchable coupler which allows light to be selectively coupled from either of a pair of input optical fibers to a single output optical fiber which is coupled to the crystal fiber. The pumping illumination is initially supplied to the crystal fiber to invert the ions within the crystal. Once these ions are inverted, the coupler is switched to permit the application of the signal to be amplified to the crystal, and the application of pumping illumination is temporarily discontinued. The signal to be amplified propagates through the crystal to stimulate emission of coherent light from the laser material resulting in amplification of the signal. When this amplification process is complete, pumping illumination is again applied through the switch to the crystal fiber.

18 Claims, 11 Drawing Figures

OTHER PUBLICATIONS

Kapany et al., Journal of the Optical Society of America, vol. 58, No. 9, Sep. 1968, "Coherent Interactions Between Optical Waveguides, etc.".

Periasamy et al., *Applied Physics*, vol. 24, No. 3, Mar. 1981, pp. 201–203, "Laser Amplification in an Optical Fiber by Evanescent Field Coupling".

H. Injeyan et al., "Light Amplification by Evanescent Wave Coupling in a Multimode Fiber", *Applied Optics*, vol. 21, No. 11, Jun. 1, 1982, pp. 1928–1932.

Digonnet et al., "Analysis of a Tunable Single Mode Optical Fiber Coupler", IEEE Journal of Quantum Electronics, vol. QE-18, No. 4, Apr. 1982.

Nakazawa et al., "Active Transmission Line: Light Amplification by Backward-Stimulated Raman Scattering in Polarization-Maintaining Optical Fiber", *Optical Society of America*, vol. 1, No. 1, Mar. 1984.

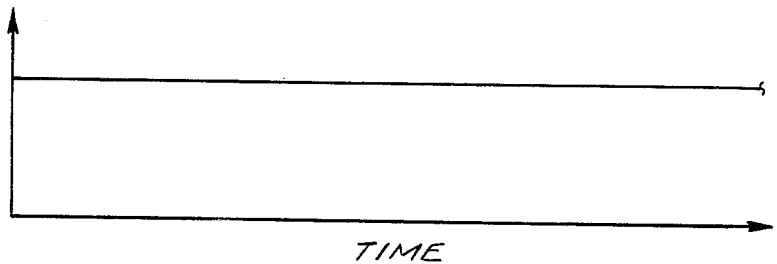
Fig. 3 PUMPING ILLUMINATION
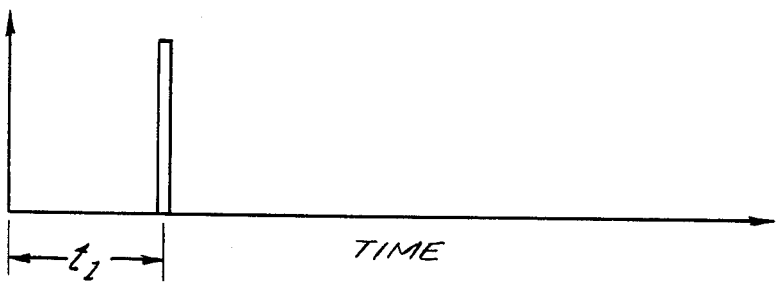
Fig. 3b INITIAL LIGHT PULSE
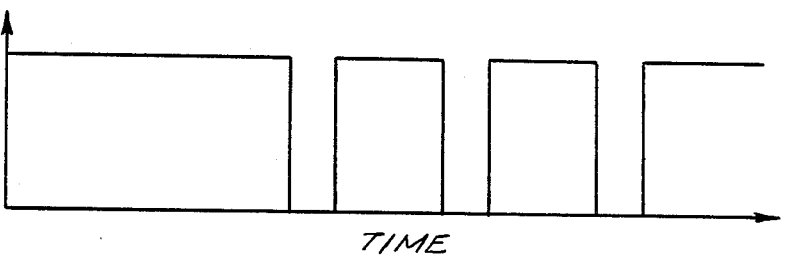
Fig. 3c SWITCH DRIVING SIGNAL
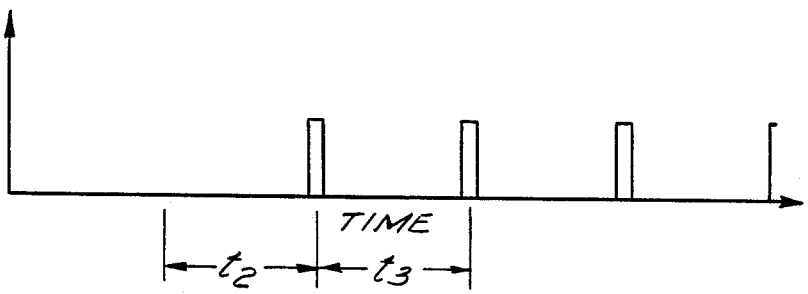
Fig. d CIRCULATING LIGHT PULSE
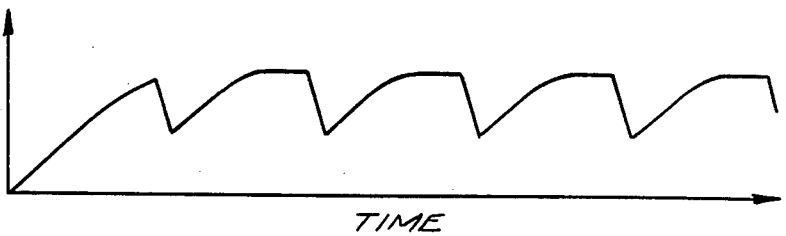
Fig. 3e ION INVERSION RATIO

SWITCHING FIBER OPTIC AMPLIFIER

BACKGROUND OF THE INVENTION

The concept of optical amplifiers, based upon the lasing capability of certain materials, particularly on a macroscopic level, is well known. Thus, for example, it is known to place a pumping light source and a single crystal neodymium-ytrium aluminum garnet (ND:YAG) rod, several millimeters in diameter and several centimeters in length, in a tubular reflective cavity. For example, the light source and ND:YAG rod may be located, respectively, to extend along the two foci of a cavity having an elliptical cross-section. In such an arrangement, light emitted by the light source and reflected from the cavity walls will impinge upon the ND:YAG rod. The light source is preferably selected to emit wavelengths corresponding to the absorption spectra of the ND:YAG crystal so that the neodymium ions of the crystal are inverted to an energy level above the upper laser level. After inversion, an initial relaxation of the neodymium ions through phonon radiation yields an ion population at the upper laser level. From this level, the ions will lase, to a lower laser level, emitting light of a wavelength which is characteristic of the ND:YAG material. Advantageously, the lower laser level is above the ground level for the ions so that a rapid, phonon-emitting relaxation will occur between the lower laser level and the ground level, enabling a high inversion ratio to exist between the upper and lower laser levels within the pumped ions.

With the population so inverted, as is well known from laser technology, the ND:YAG will provide a very slow fluorescence, that is, random emission of incoherent light. This spontaneous radiation, however, does not prohibit the rod from amplifying, since the average lifetime of ions in the inverted state is 230 microseconds, much longer than the initial relaxation or that to the ground level. Thus, a high inversion ratio can be maintained.

If, after some of the neodymium ions of the ND:YAG rod have been inverted, a light signal at the lasing frequency is transmitted through the rod, the light signal will trigger the relaxation of the neodymium ions, causing coherent emission of stimulated radiation, which will effectively add to the transmitted signal, thus amplyfing this signal.

The absorption length of the pumping illumination within the ND:YAG crystal (i.e., the length of material through which the illumination must traverse before about 65% of the illumination is absorbed) is typically in the range between 2 to 3 millimeters, and thus the ND:YAG crystals used in amplifying structures have had diameters at least this large so that the crystal could absorb a substantial portion of the pumping radiation during the initial reflection from the cavity walls and passage through the crystal. If, during this initial traverse through the crystal, the pumping illumination is not absorbed, it is reflected by the cavity walls back to the light source, where it will be reabsorbed, generating heat in the light source and reducing the overall efficiency of the amplifier.

When such amplifiers are used in fiber optic systems, it has been thought necessary to use optical components, such as lenses, to focus light from the optical fiber into the ND:YAG rod, and the amplified light signal from the ND:YAG back into another fiber. Such optical systems require careful alignment and are susceptible to environmental changes, such as vibration and thermal effects. Additionally, the optical components and the size of the ND:YAG rod make the amplifying system relatively large, and thus impractical for certain applications. Furthermore, the relatively large size of the ND:YAG rod introduces beam wander within the rod. Thus, the signal from the input fiber optic element will traverse different paths through the rod, a characteristic which is temperature related and varies with time, so that the output light may be lost due to the fact that the fiber will accept only light within a small acceptance angle. Thus, as the beam within the ND:YAG rod wanders, the output signal may vary in an uncontrollable manner. Furthermore, the large size of the ND:YAG rod requires a large amount of input energy in order to maintain a high energy density within the rod. Such large pump power requires high output light sources, generating substantial heat which must be dissipated, typically by liquid cooling of the cavity.

While amplifiers of this type are useful in many applications, such as some communications applications, a use which puts severe limitations upon the amplification system is a recirculating fiber optic gyroscope. With such gyroscopes, optical fiber, typically a kilometer or more in length, is wound into a loop, and a light signal is recirculated within the loop in both directions. Motion of the loop causes a phase difference between the counter-propagating light signals which may be used to measure gyroscope rotation. It is advantageous, because the phase shift induced in one rotation is relatively small and because periodic outputs relating to rotation are required, to recirculate input light within the loop as many times as possible.

In traversing a kilometer of optical fiber, an optical signal will typically lose 30 to 50 percent of its intensity. An amplifier, if capable of amplifying the bidirectional counter-propagating light signals, would permit a light signal to propagate many times within the loop, if the amplifier were placed in series with the loop, and provided a gain equal to the fiber propagating loss.

Unfortunately, the relatively large size, high power requirements caused by relatively inefficient performance, beam wander effects, and cooling requirements of prior art ND:YAG rod amplifiers makes such amplifiers relatively impractical for high accuracy gyroscopes. These factors, of course, also limit the utility of such amplifiers in other applications, such as communication networks.

SUMMARY OF THE INVENTION

These disadvantages associated with crystal rod amplifiers are alleviated in the present invention. This invention permits both the pumping illumination and the signal to be amplified to be applied to the end of the ND:YAG fiber, and thus completely avoids the requirement for a large diameter for the ND:YAG crystal, which is inherent in side pumping arrangements. The ND:YAG fiber may thus be made extremely small in diameter in comparison with prior art rod amplifiers, since pumping illumination is absorbed along the length of the fiber rather than across its width. This results in a higher concentration of pumping illumination within the small diameter of the ND:YAG crystal, and thus a higher potential gain for the amplifying structure.

In order to accomplish this end pumping, the ND:YAG material is formed as a small diameter fiber and is placed in series with a switchable coupler, which selectively applies pumping illumination or the signal to be amplified to the end of the ND:YAG fiber. Because the spontaneous fluorescence time associated with the crystal is relatively long, it remains in an active, or inverted, state for some time after the pumping illumination is discontinued, and thus still amplifies the later-introduced signal.

The switchable coupler, used in this amplifying system, includes a pair of input fibers for transmitting, respectively, the pumping illumination for ND:YAG crystal and the signal to be amplified. The signals on these fibers are selectively applied to a single output fiber by the switchable coupler so that the ND:YAG material may first be pumped to invert the neodymium ions therein and may then be subjected to the signal to be amplified so that this signal, in traversing the ND:YAG material, may trigger the emission of coherent light to amplify the signal.

The switching coupler used in this system is based upon single mode optical fiber couplers in which a pair of single mode fibers are positioned adjacent to one another through a selectable interaction length to permit evanescent field coupling. More specifically, the switchable coupler includes two such single mode couplers, each adjusted so that they couple 50% of the light entering each fiber in the coupler fiber pair to the other fiber in this pair. Between this pair of couplers, one of the fiber pairs is selectively stretched, as by a piezoelectric crystal, in order to introduce an adjustable phase difference between the light signals applied to the second coupler of the coupler pair. This selectable phase difference permits constructive interference of the light from one of the input fibers at the output fiber of the switch and destructive interference of the light from the other input fiber so that only the light from one of the input fibers is supplied at the output fiber of the second coupler. By changing the voltage applied to the piezoelectric crystal, the input fiber whose light constructively interferes at the output fiber may be selected.

A timing system is utilized to apply a changing voltage signal to the piezoelectric crystal to assure that the switchable coupler is properly timed to couple input light signals to be amplified to the amplifying crystal. At times when no input light signal to be amplified is expected, the timing circuit provides voltage levels to the piezoelectric crystal necessary to couple pumping illumination to the ND:YAG material. Thus, at all times when no light input signal to be amplified is present, the laser material may be supplied with pumping illumination.

Because the present invention permits the pumping illumination to be coupled into the end of the ND:YAG fiber, the diameter of the ND:YAG fiber need not exceed the absorption length at the pumping wavelength, since the pumping illumination is effectively absorbed in a direction along the axis of the ND:YAG fiber, rather than perpendicular to that axis.

In order to achieve uniform bidirectional amplification within the ND:YAG crystal, pumping illumination may be supplied by switchable couplers arranged at both ends of the ND:YAG fiber, providing a symmetrical inversion population along the length of this fiber.

BRIEF DESCRIPTION OF THE DRAWINGS

These and other advantages of the present invention are best understood through reference to the drawings, in which:

FIGS. 3A through 3E are plots of illumination pulses and electrical signals within the amplifier of FIG. 2;

DETAILED DESCRIPTION OF THE PREFERRED EMBODIMENT SWITCHABLE COUPLER

Figure 1:
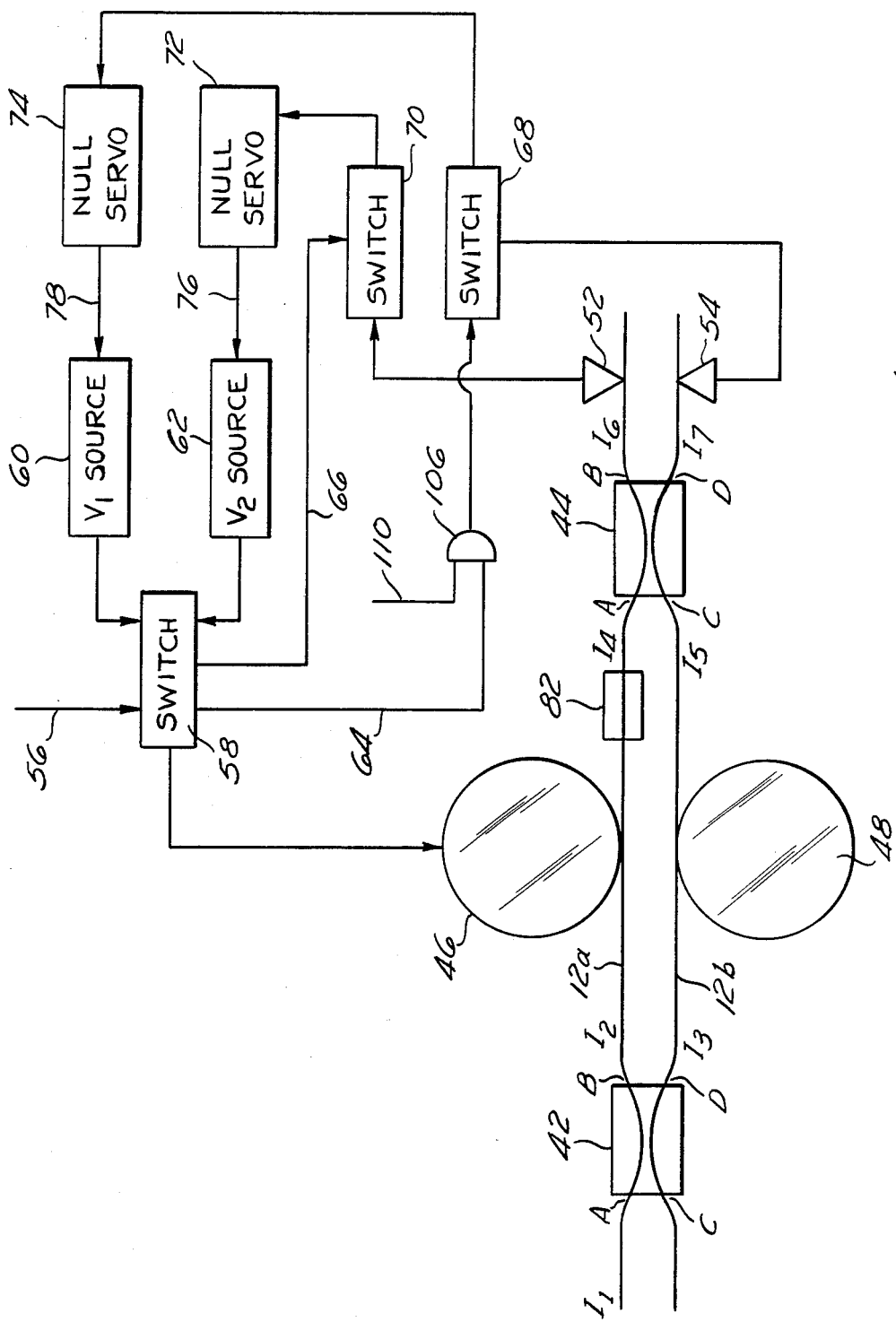
FIG. 1 is a schematic illustration of the switchable coupler used in the amplifier of the present invention.

The amplifier of this invention utilizes a switchable coupler which is described in detail in copending patent application Ser. No. 523,150 Filed 8/15/83, entitled "Fiber Optic Switchable Coupler." That application is hereby incorporated herein by reference. The switchable coupler of that application is shown in FIG. 1 and includes a pair of optical fiber couplers 42 and 44. These couplers each include two fiber optic strands 12A and 12B of a single mode fiber optic material mounted in longitudinal arcuate grooves within the couplers 42,44. Each of the couplers, 42,44, includes a pair of blocks for supporting these fibers 12A,12B to provide a base for (a) polishing a portion of the cladding of the fibers 12A,12B, and (b) supporting the fibers 12A,12B for superimposition and adjustment of the fiber areas where the cladding has been removed by polishing.

The removal of cladding and the superimposition of the polished regions of the fibers 12A and 12B permits the cores of these respective fibers 12A,12B to be located within the evanescent field of the other fiber at an interaction region. If the core of each of the fibers is placed within a critical zone relative the other fiber, single mode coupling will occur between the fibers with extremely low throughput loss and high directivity. Moreover, the blocks which form the couplers 42,44 may be relatively positioned to provide accurate adjustment of the coupling efficiency, that is, the percentage of light input on one of the fibers 12A,12B which is coupled to the alternate fiber.

As described in the above-referenced application, if it is assumed that an input light signal designated $I_1$ is supplied to a port A of the coupler 42, and if it is further assumed that each of the couplers 42 and 44 are adjusted so that their coupling efficiency is 50%, the light signal $I_1$ can be made to selectively appear at either of the output ports B or D of the coupler 44.

This switching action of the coupler of FIG. 1 occurs as follows. The light signal $I_1$ will be split by the coupler 42, since this coupler is adjusted to have a coupling efficiency of 50%. Thus, half of this light signal will appear as signal $I_2$ at output port B of the coupler 42. The other half of this signal will be coupled to the fiber 12B to be output as signal $I_3$ on port D of the coupler 42. Because of the characteristics of the coupler 42, the signal $I_3$ will lag the signal $I_2$ in phase by 90°.

The fiber 12A is wrapped around a piezoelectric crystal 46 and the fiber 12B is wrapped around a matching mandrel 48. A polarization controller 82 may be used to assure that the polarization of the light signals at the input ports A and C of the coupler 44 is identical, thus assuring that these light signals will interfere within the coupler 44. A signal is supplied from a switch 58 to the piezoelectric crystal 46 to selectively stretch the optical fiber 12A wrapped around the piezoelectric crystal 46, thus inducing a variable phase delay to the light signal on the optical fiber 12A, yielding a variable phase relationship between the light signal $I_2$ and the light signal $I_4$ at input port A of the coupler 44.

Light which is coupled in the coupler 44, such as the light signal $I_5$ entering the port C of the coupler 44, and coupled to the fiber 12A to exit the coupler 44 at port B, providing a portion of the light signal $I_6$, will undrgo a 90° phase delay. Similarly, the portion of the light signal $I_4$ entering port A of the coupler 44 and coupled to the fiber 12B to exit the coupler 44 as a portion of the signal $I_7$ at port D of that coupler 44 will also undergo a 90° phase delay.

Because of the phase relationship induced by the couplers 42 and 44 and the variable phase delay introduced by the piezoelectric crystal 46, the signal $I_1$, in a first configuration of the piezoelectric crystal 46, will constructively add at the output port B of the coupler 44 and destructively interfere at the output port D of the coupler 44. With an alternative voltage on the piezoelectric crystal 46, the light input signal $I_1$ at the port A of the coupler 42 will constructively add at the output port D of the coupler 44 and destructively interfere at the output port B of the coupler 44. Thus, an adjustment of the voltage on the piezoelectric crystal 46 is used to selectively switch the signal $I_1$ between output ports B and D of the coupler 44. In the same manner, if a light input signal is provided at port C of the coupler 42, it will be switched between the output ports B and D of the coupler 44 in an identical manner. It is thus possible, by applying a varying voltage to the piezoelectric crystal 46, to selectively apply either the light input signal at port A of the coupler 42 or at port C of the coupler 42 to output port D of the coupler 44, with the alternate signal appearing at output output port B of the coupler 44.

As disclosed in detail in the referenced application, an electronic system may be utilized in the switchable coupler of FIG. 1 to adjust the voltage applied to the piezoelectric crystal 46. A pair of sensors 52 and 54 are connected to the optical fibers 12A and 12B adjacent the ports B and D of the coupler 44 to sense the output light level at these ports. The sensors 52 and 54 provide electrical sense signals which are supplied through a pair of switches 68 and 70 to null servos 72 and 74 which adjust output voltage levels from a pair of voltage sources 60 and 62. The switch 58 selectively applies the output voltage $V_1$ from the source 60 or the output voltage $V_2$ from the source 62 to the piezoelectric crystal 46. When the switch 58 supplies the voltage $V_1$ from the source 60 to the piezoelectric crystal 46, the light signal $I_1$ will constructively interfere at output port B of the coupler 44, and light signals supplied at port C of the coupler 42 will constructively interfere at output port D of the coupler 44.

During this time, the switch 68 is made conductive, and the switch 70 is made non-conductive by slaving these switches to the switch 58. Thus, the null servo 74 will sense whether the signal at port D of the coupler 44, $I_7$, is a null, and, through a signal on a control line 78, will adjust the voltage $V_1$ of the source 60. Similarly, when the output $V_2$ from the source 62 is supplied by the switch 58 to the piezoelectric crystal 46, the null servo 72 will provide a control signal on a line 76 necessary to adjust the voltage $V_2$ to provide a null light signal $I_6$ from input port A of the coupler 42 at port B of the coupler 44. An input line 56 operates the switch 58 to alternatively supply the output from voltage source 60 or voltage source 62 to the piezoelectric crystal 46 to switch the coupler.

Figure 2:
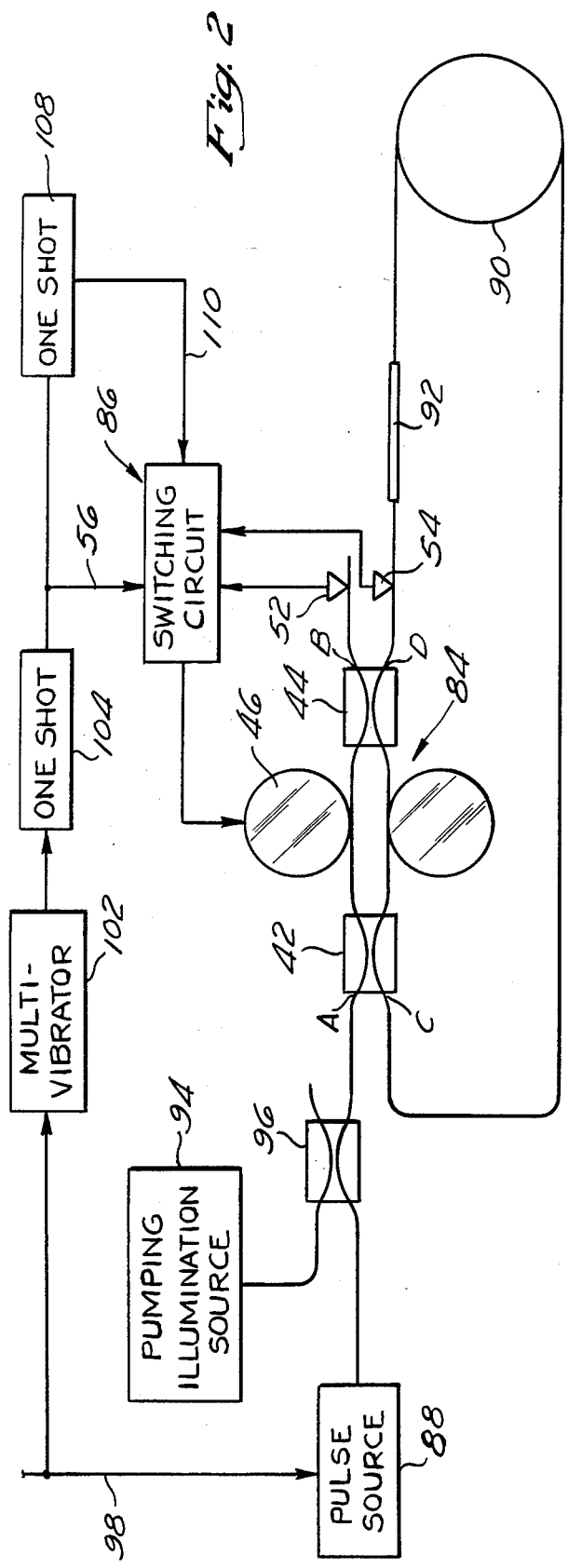
FIG. 2 is a schematic diagram of the switchable coupler of FIG. 1 incorporated within the amplifying structure of the present invention.

Referring now to FIG. 2, there is shown the switchable coupler 84 described above in reference to FIG. 1 which includes the piezoelectric crystal 46 and the switchable couplers 42 and 44, as well as the switching circuit 86 which includes the electronics described above in reference to FIG. 1. As previously described, the switching circuit 86 is supplied with signals indicative of the light output from the coupler 44 by the photosensors 52,54. In the example shown in FIG. 2, it will be assumed that light from a pulse light source 88 is to be supplied by the switchable coupler 84 to a fiber loop 90 which includes an amplifying ND:YAG fiber crystal 92. This ND:YAG fiber crystal 92 is provided with pumping illumination from a source 94 whenever a recirculating pulse signal from the loop 90 is not present at the switchable coupler 84. The pulses from the pulse source 88 and pumping illumination from the source 94 are coupled to the input of the switchable coupler 84 by an optical coupler 96 constructed in the same manner as the couplers 42 and 44, but providing a coupler 96 to the ND:YAG crystal 92. When the recirculating light pulse of FIG. 3D appears at port C of the coupler 42, it is desired that this light pulse should be coupled to the ND:YAG crystal 92 for continued circulation within the loop 90. For this reason, the switchable coupler 84 is temporarily switched to its alternate switching mode ($V_2$ from source 62, FIG. 1) to allow the input pulse at Port C of the coupler 42 to constructively interfere at the output port D (FIG. 1) of the coupler 44.

This switching of the switchable coupler 84 is accomplished by a combination of a free-running multivibrator 102, whose operation is initiated by the signal on line 98 which activates the pulse source 88, and a monostable multivibrator or one-shot 104, triggered by the output of the free-running multivibrator 102. This combination provides an output signal on line 56, as shown in FIG. 3C, with the multivibrator 102 adjusted to a free-running frequency of 200 KHz to provide an output pulse of predetermined duration from the one-shot 104 every 5 microseconds. It will be seen from FIG. 3C that the driving signal on line 56 provides constructive interference from port A of the coupler 42 to the ND:YAG crystal 92 at all times when a recirculating pulse, as shown in FIG. 3D, is not present at port C of the coupler 42. The duration of the pulse from the one-shot 104, shown as the low level signal portion of FIG. 3C, has a duration which is sufficient to assure that the circulating light pulse of FIG. 3D will fall well within the pulse duration of FIG. 3C.

From the above description, it can be seen that the switchable coupler 84, in combination with the electronics described, successively applies the output of the pumping illumination source 94, or the recirculating light pulse to be amplified, to the input end of the ND:YAG crystal 92. Because the switching electronics, described in reference to FIG. 1, are designed to sense a null at the light sensors 52 and 54 to properly adjust the voltage levels $V_1$ and $V_2$, it may be necessary to sense the output of the photodetector 54, for setting of voltage source 60, during a time defined by the low voltage portion of the signal of FIG. 3C when there is no recirculating pulse of FIG. 3D present. This may be accomplished, for example, through the addition of an AND gate 106, as shown in FIG. 1, and an additional monostable multivibrator or one-shot 108, as shown in FIG. 2. This additional one-shot will have a very short time duration output pulse which occurs at the beginning of the output pulse from the one-shot 104, the short pulse from the one-shot 108 being supplied on a signal line 110. This signal line 110 enables the AND gate 106 (FIG. 1), and thus the switch 68, only during a very short period of time when the signal from the one-shot 104 is in its low voltage state, as shown in FIG. 3C, but before the arrival of a circulating light pulse, as shown in FIG. 3D. During this short period of time, the pumping illumination source, whose output is continuous, should destructively interfere on the optical fiber at the input of the ND:YAG crystal 92, and a null may thus be sensed by the photodetector 54.

ND:YAG Amplification

Figure 4:
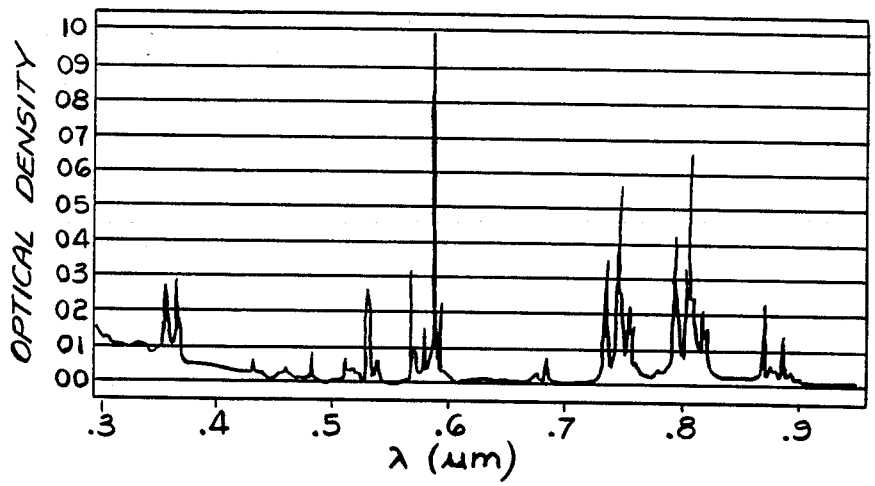
FIG. 4 is a diagram showing the absorption spectrum of ND:YAG at 300° K.

Referring now to FIG. 4, which is a diagram of the absorption spectrum of the ND:YAG crystal 92 at 300° K., it can be seen that ND:YAG material has a relatively high optical density, and thus a short absorption length, at selected wavelengths. For this reason, it is advisable to select the wavelength of the pumping illumination source 94 in order to permit the absorption length to be as short as possible. This will permit substantially complete absorption of the pumping illumination within a very short length of the ND:YAG crystal 92. As can be seen from FIG. 3, the wavelength 0.58 micron is best suited for pumping illumination, although the wavelengths 0.75 and 0.81 microns are relatively well suited.

Figure 5A:
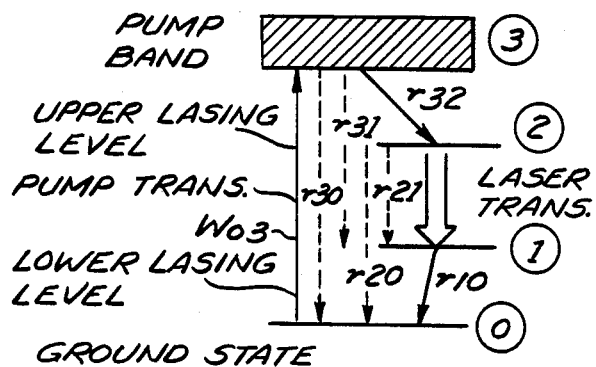
FIGS. 5A and 5B are simplified energy level diagrams of a four-level laser using a doped material, such as ND:YAG.
Figure 5B:
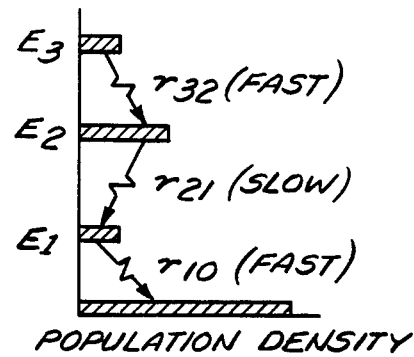

Referring now to FIG. 5A, which is an energy level diagram for the ND:YAG crystal 92, it will be understood that, when pump light at the absorption wavelength, described above, is absorbed by the ND:YAG crystal 92, neodymium ions are excited from the ground state to the pump band. From the pump band, the ions quickly relax, through phonon interactions, to the upper laser level. From this upper laser level. From this upper laser level, the neodymium ions will undergo a relatively slow fluorescence to the lower laser level. From this latter level, a final, rapid phonon relaxation occurs to the ground state. This latter rapid relaxation in a four-level laser system of the type shown in FIG. 5A is advantageous, since the rapid phonon relaxation between the lower laser level and the ground state provides a practically empty lower laser level. This feature is shown in FIG. 5B, in which the population densities at the pump band, upper laser level, lower laser level, and ground state are shown for the ND:YAG crystal 92 during continuous pumping. Because the rate of fluorescence between the upper laser level and lower laser level is relatively slow in comparison with the phonon relaxation between the pump band and the upper laser level, as well as between the lower laser level and the ground state, the population density at the upper laser level is substantially higher than that at the lower laser level, yielding a high inversion ratio. The average lifetime of neodymium ions at the upper laser level, prior to spontaneous fluorescence, is 230 microseconds. This relatively long life permits the pumping illumination to be discontinued by the switching coupler 84 (FIG. 2) prior to the input of a light signal to be amplified, since the neodymium ion population will remain substantially inverted for several microseconds.

The signal to be amplified is selected to have a wavelength at the laser transition wavelength (1.064 microns), i.e., the wavelength of light emitted by the ND:YAG ions during relaxation between the upper and lower laser levels. When this signal is supplied to the crystal 92 by the switchable coupler 84 (FIG. 2), it will trigger the emission of stimulated photons at the same frequency, coherent with the signal, and the signal is thereby amplified. Thus, the passage of light at this frequency will cause a photon emitting relaxation between the upper laser level and the lower laser level of FIG. 5A, in phase with the light signal to be amplified, yielding an effective gain for the input light signal.

The gain which can be achieved in the amplifier of this invention is dependent upon the density of the inverted neodymium ion population within the ND:YAG crystal 92. Initially, the ultimate inversion population is limited by the lattice structure of the YAG material 92 itself, since in ND:YAG material ytrium atoms are replaced with neodymium atoms in the crystal lattice. Only approximately 1 ytrium atom in each 100 ytrium atoms may be replaced by a neodymium ion without distorting the lattice structure of the ND:YAG material.

Theoretical calculations of the small gain signal $g_0$ of the amplifier of this invention can be made, using the relation $g_0 = \sigma \Delta N$, where $\sigma$ is the stimulated emission cross-section, for ND:YAG, $8.8 \times 10^{-19}$ cm$^2$, and $\Delta N$ is the population inversion density given by:

$$\Delta N = \frac{P_p}{V} \frac{n_1 n_2 t_{sp}}{h\nu} \quad (1)$$

where $P_p$ is the absorbed pump power, V is the crystal volume and thus, $P_p/V$ is the absorbed pump power per unit of fiber volume, $t_{sp}$ is the spontaneous radiative lifetime, that is, the 230-microsecond fluorescence relaxation time of the neodymium ions, $n_1$ is the effective spectral overlap of pump output with an ND:YAG absorption line, as shown in FIG. 4, $n_2$ is equal to the quantum efficiency of 1.064 - micron fluorescence, namely 0.63, and h is equal to the energy of one pump photon.

Combining the above relationship provides:

$$g_0 = \sigma \frac{P_p}{V} \frac{n_1 n_2 t_{sp}}{h\nu} \quad (2)$$

for the dependence of gain on pump power. It should be recognized that the value $P_p$ is the absorbed pump power and that an increase in the length of the crystal 92 does not necessarily increase the gain. Thus, if the pumping radiation from the source 94 is coupled completely to the ND:YAG crystal 92, and travels in the crystal 92 a distance which is sufficient to permit this crystal 92 to nearly completely absorb the pumping radiation, then the value $P_p$ in this equation may be replaced by the input power level. To obtain the net gain, however, one must subtract from $g_0$ the propagation losses within the ND:YAG crystal 92 at 1.064 microns. A loss of 100 db per kilometer would reduce the gain by only 0.001 db per centimeter. Thus, if the overall length of the crystal 92 can be maintained relatively short, while still absorbing substantially all of the input pump power, the propagation losses within the amplifier can be maintained at a low level.

Because of the relatively slow fluorescence of the ND:YAG crystal material 92, the application of pumping illumination may be discontinued in the manner described above in reference to FIGS. 3A through 3D, so that the coupler 84 may supply the recirculating pulse of FIG. 3D to the ND:YAG crystal 92 during short periods of time defined by the low voltage portion of FIG. 3C when no pumping illumination is supplied to the crystal 92.

The effect of this alternate application of pumping illumination and input signal to the ND:YAG crystal 92 is shown in the ion inversion ratio plot of FIG. 3E. From this plot, it will be seen that the ions of the ND:YAG fiber 92 are initially inverted by the pumping illumination from the source 94 during the period $T_1$. Ten percent of the initial light pulse from the pulse source 88 is coupled by the coupler 96 to the switchable coupler 84 and applied to the ND:YAG fiber 92, as shown in FIG. 3B. This light pulse is amplified in the crystal 92, depleting the ion inversion ratio, as shown in FIG. 3E. The continuing pumping illumination from the source 94 then reinverts the ion population within the crystal 92 in preparation for the application of the next successive pulse from the loop 90, which appears after a time $T_2$, as shown in FIG. 3D. This pulse is amplified in the crystal 92, depleting the ion inversion ratio, as shown in FIG. 3E. This process continues, controlled by the free-running multivibrator 102, with the switchable coupler 84 operating to provide output light from the pumping illumination source 94 to the crystal 92 at all times when a recirculating pulse is not present at the input of the switchable coupler 84, but switching to its alternate mode during the period defined by the one-shot 104, to couple the recirculating light pulses of FIG. 3D to the crystal 92 when they appear at the input of the switchable coupler 84.

Figure 6:
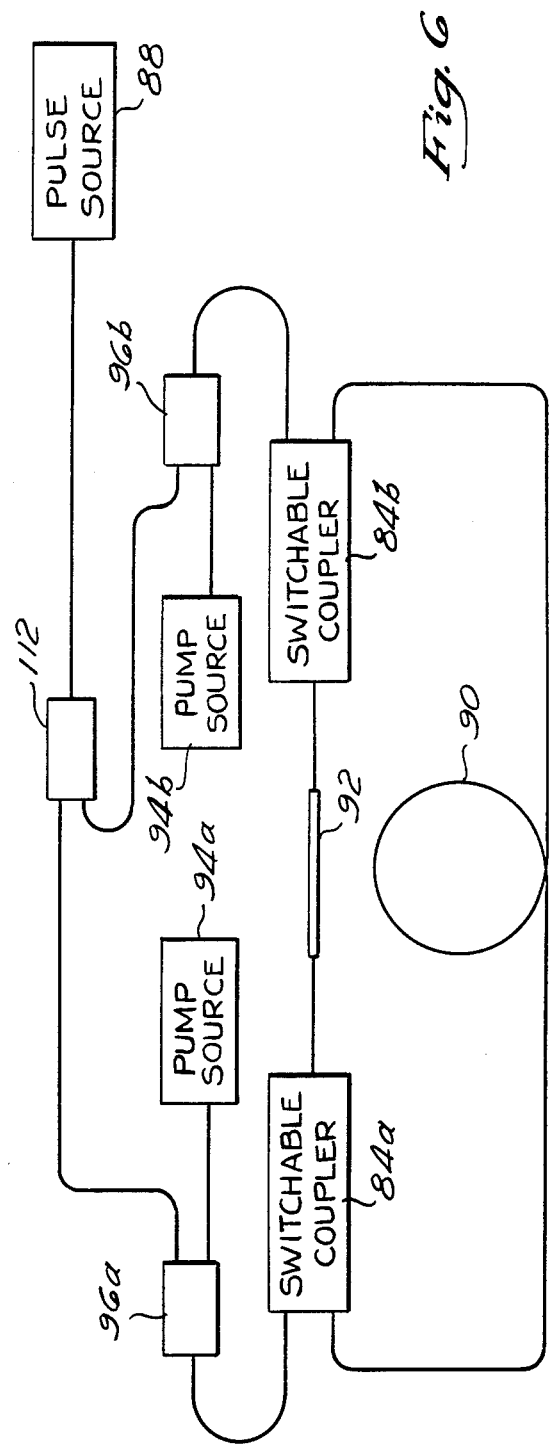
FIG. 6 is a schematic diagram of an amplifier in accordance with the present invention which provides counter-propagating pulse insertion into a fiber loop and symmetrical amplification.

It will be understood that, in many circumstances, it is necessary to provide counter-propagating pulses from the pulse source 88 within the loop 90. The apparatus, shown in FIG. 6, is an embodiment of the amplifier which not only provides such counter-propagation, but permits uniform bidirectional amplification within the ND:YAG 90% coupling efficiency. Thus 90% of the output of the pumping illumination source 94 is supplied by the coupler 96 to the switchable coupler 84, while 10% of the output of the pulse source 88 is supplied to the switchable coupler 84. This 10% of the light pulse output from the pulse source 88 is coupled by the switchable coupler 88 to the ND:YAG crystal 92 where the pulse is amplified and supplied to the fiber loop 90. For purposes of the present explanation, it will be assumed that the loop 90 is approximately a kilometer in length and thus, the pulse signal exits the loop 90 and is transmitted to port C of the coupler 42 after a delay of approximately 5 microseconds, the time required for the light pulse to traverse a kilometer of fiber.

Referring now to FIG. 3A, in conjunction with FIG. 2, it will be seen that the output illumination from the pumping source 94 is continuous, and thus the coupler 96 provides 90% of this output from the source 94 continously at port A of the coupler 42 of the switch 84.

As shown in FIG. 3B, after some initial period of time required for inverting the neodymium ions of the crystal 92, in the manner described below, the pulse source 88 will provide an output light signal. The pulse source 88 is triggered by a signal on an input control line 98, shown in FIG. 2. The light pulse shown in FIG. 3B thus traverses the switchable coupler 84, is amplified in the crystal 92 in the manner described below, and circulates through the loop 90 to reappear after an additional time of $T_2$ (5 microseconds) at the input port C of the coupler 42, this light pulse being shown in FIG. 3D. Up until the time that this recirculating light pulse of FIG. 3D appears at the port C of the coupler 42, the signal on the piezoelectric crystal 46 is maintained at a level ($V_1$ from the source 60, FIG. 1) to coupler output light signals from the crystal 92. In the apparatus of FIG. 6, a pair of switchable couplers 84A and 84B, designed in accordance with the description provided in reference to FIG. 2, are provided on opposite ends of the crystal 92. These switchable couplers are provided with pumping illumination from a pair of pump sources 94A and 94B, in the same manner as discussed above in reference to FIG. 2, a pair of couplers 96A and 96B being utilized to couple 90% of the output of the sources 94A,94B to the switchable couplers 84A,84B, respectively. The pulse source 88 is connected to a coupler 112, constructed in the same manner as the couplers 42 and 44, and adjusted for a 50% coupling efficiency. Thus, the output of the pulse source 88 is split, half of the output light pulse being provided to the coupler 96A and the remaining half being provided to the coupler 96B. At these latter couplers 96A,96B, 10% of this 50% will be coupled to the switchable coulers 84A and 84B, respectively, for counter-propagation within the loop 90. It will be understood that control voltages are supplied to the switchable couplers 84A and 84B in the manner described in reference to FIG. 2.

The arrangement of FIG. 6 permits the counter-propagation of pulses in the loop 90, but also permits pumping illumination to be provided at both ends of the ND:YAG crystal 92.

If only a single pump source is utilized, as shown in the arrangement of FIG. 2, the ND:YAG crystal 92 will not be uniformly illuminated. Thus, the inverted population of neodymium ions will not be uniformly distributed along the length of the crystal 92. Because this non-uniform or non-symmetrical state within the amplifier may yield different gain for signals input from the switchable coupler 84A than for signals input from the switchable coupler 84B (particularly when these signals occur simultaneously), it is advantageous to utilize the pair of pump sources 94A,94B.

The phenomenon of dissimilar gain for signals traversing the crystal 92 in different directions with a non-symmetrical inversion population of neodymium ions occurs as follows. It will be recognized that, as the signal to be amplified propagates from left to right in the crystal 92 of FIG. 6, it will trigger the emission of stimulated photons within the ND:YAG crystal 92. Such triggering emission, of course, lowers the inversion population within the crystal 92, as shown in FIG. 3E. If, for example, in a gyroscope, a pair of pulses propagate simultaneously through the crystal 92 in opposite directions, the signal input at the left end will deplete the inversion population adjacent this end before the signal input at the right end arrives at the left end of the crystal 92, as viewed in FIG. 6. If the inversion population is higher at the left end of the crystal 92 than at the right end, as would be the case if only a single pump source 94 were utilized, the signal input at the left will undergo a greater amplification, since it will deplete the inversion population before the signal which is input at the right end arrives at the high density left end. Thus, the pair of pump sources 94A,94B, and switchable couplers 84A, 84B, shown in FIG. 6, may be utilized to provide amplification symmetry.

What is claimed is:

1. An amplifier for fiber optic systems, comprising:
   a crystal fiber formed of material which is capable of lasing;
   a source of pumping illumination for inverting said material;
   a source of signals to be amplified; and
   switching means coupled to said source of pumping illumination, said source of signals to be amplified, and one end of said crystal fiber for alternatively coupling said pumping illumination or said signals to be amplified to said one end of said crystal fiber.

2. An amplifier for fiber optic systems, as defined in claim 1, wherein said switching means comprises:
   a first fiber optic coupler having a pair of input optical fibers, one of said pair of optical fibers connected to said source of pumping illumination, and the second of said pair of optical fibers being connected to said source of signals to be amplified, said first fiber optic coupler including a pair of output optical fibers;
   a second fiber optic coupler, including a pair of input optical fibers connected to said output optical fibers of said first fiber optic coupler, said second fiber optic coupler having an output optical fiber connected to said one end of said crystal fiber; and
   means for introducing a selectable phase shift in light coupled to one of said pair of input optical fibers of said second fiber optic coupler.

3. An amplifier for fiber optic systems, as defined in claim 2, wherein said means for introducing a selectable phase shift operates in a first and second mode, said first mode causing light input on said one of said pair of input optical fibers of said first fiber optic coupler to constructively add at said output optical fiber of said second fiber optic coupler, said second mode causing light introduced at said second of said pair of input optical fibers of said first optical coupler to constructively add at said output optical fiber of said second fiber optic coupler.

4. An amplifier for fiber optic systems, as defined in claim 3, additionally comprising control means for determining the mode of said means for introducing a selectable phase shift, said control means operating said means for introducing a selectable phase shift in said first signals to be amplified.

5. An amplifier for fiber optic systems, as defined in claim 4, wherein said signals to be amplified recur on a periodic basis, and wherein said control means alternates the mode of said means for introducing a selectable phase shift on a periodic basis between said first and said second modes.

6. An amplifier for light signals in a fiber optic system, comprising:
   a source of light signals to be amplified;
   a crystal doped with material which is capable of lasing at the frequency of said light signals;
   an illumination source for inverting the ion population of said material; and
   means for alternatively connecting said illumination source or said source of light signals to an end of said crystal.

7. An amplifier for light signals, as defined in claim 6, wherein said light signals to be amplified are bidirectional and wherein said means for alternatively connecting connects said bidirectional light signals to opposite ends of said crystal.

8. An amplifier for light signals, as defined in claim 7, wherein said means for alternatively connecting connects said illumination source to both ends of said crystal to bidirectionally illuminate each crystal.

9. An amplifier for light signals, as defined in claim 6, additionally comprising:
   means for introducing said light signals to be amplified into said fiber optic system, said means comprising:
   means for combining said light signals with light from said illumination source to produce a combination light signal; and
   means for conducting said combination light signal through said means for alternately connecting to a fiber within said fiber optic system.

10. An amplifier for light signals, as defined in claim 6, wherein said means for alternately connecting comprises:
    a pair of fiber optic couplers, the output fibers of one of said couplers connected to the input fibers of the other of said couplers; and
    means for introducing a phase shift in light transmitted by one of said optical fibers between said pair of fiber optic couplers.

11. An amplifier for light signals, as defined in claim 10, additionally comprising a feedback system for regulating said phase shift.

12. An amplifier for light signals, as defined in claim 11, wherein said means for introducing a phase shift comprises a loop of optical fiber between said couplers wrapped around a piezoelectric crystal.

13. A method of amplifying light signals in a fiber optic system utilizing a crystal doped with material which is capable of lasing at the wavelength of said light signals and a source of illumination for pumping said crystal comprising:
    coupling said source of illumination to one end of said crystal during a first time period prior to the arrival of said light signals;
    uncoupling said source of illumination from said crystal prior to the arrival of said light signals; and
    coupling said light signals, upon their arrival, to said one end of said crystal.

14. A method of amplifying light signals, as defined in claim 13, wherein said coupling of said light signals occurs within the spontaneous fluorescence time of said crystal after said uncoupling step.

15. A method of amplifying light signals, as defined in claim 13, wherein said light signals arrive at regular intervals, and wherein said coupling and uncoupling steps occur periodically at said regular intervals.

16. A method of amplifying light signals in a fiber optic system having an optical fiber for supplying said light signals, a source for pumping illumination, and a crystal fiber doped with material which is capable of lasing, comprising:
    sequentially, alternatively coupling said source of pumping illumination and said optical fiber to one end of said crystal fiber to:
    (a) first pump said crystal; and
    (b) second inject said light signals from said optical fiber into said pumped crystal.

17. A method of amplifying light signals, as defined in claim 16, wherein said sequentially, alternatively coupling step is accomplished by periodically changing the mode of a switch having a pair of inputs connected to said source of said pumping illumination and said light signals and an output connected to said one end of said crystal fiber.

18. A method of amplifying light signals, as defined in claim 17, wherein said light signals recur on a regular periodic basis and wherein said mode changing step alternates the mode of said switch on a regular, periodic basis.

* * * * *